(12) United States Patent
Ash et al.

(10) Patent No.: US 7,996,609 B2
(45) Date of Patent: Aug. 9, 2011

(54) SYSTEM AND METHOD OF DYNAMIC ALLOCATION OF NON-VOLATILE MEMORY

(75) Inventors: Kevin J. Ash, Tucson, AZ (US); Robert A. Kubo, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 947 days.

(21) Appl. No.: 11/613,636

(22) Filed: Dec. 20, 2006

(65) Prior Publication Data

US 2008/0155190 A1 Jun. 26, 2008

(51) Int. Cl.
*G06F 12/00* (2006.01)
*G06F 13/00* (2006.01)
*G06F 13/28* (2006.01)

(52) U.S. Cl. ............ 711/114; 711/154; 711/156; 714/2; 714/3

(58) Field of Classification Search ................... 711/114
See application file for complete search history.

(56) References Cited

U.S. PATENT DOCUMENTS

| | | | |
|---|---|---|---|
| 5,420,983 A | 5/1995 | Noya et al. | |
| 5,572,660 A * | 11/1996 | Jones | 714/6 |
| 5,787,242 A * | 7/1998 | DeKoning et al. | 714/5 |
| 6,052,822 A * | 4/2000 | Kim et al. | 714/805 |
| 6,138,125 A | 10/2000 | DeMoss | |
| 6,516,425 B1 | 2/2003 | Belhadj et al. | |
| 6,944,711 B2 | 9/2005 | Mogi et al. | |
| 7,035,974 B2 * | 4/2006 | Shang | 711/114 |
| 7,328,306 B1 * | 2/2008 | Viswanathan et al. | 711/114 |
| 2003/0105928 A1 * | 6/2003 | Ash et al. | 711/136 |
| 2004/0093463 A1 * | 5/2004 | Shang | 711/113 |
| 2005/0055603 A1 | 3/2005 | Soran et al. | |
| 2005/0132150 A1 | 6/2005 | Jewell et al. | |
| 2005/0193273 A1 | 9/2005 | Burkey | |
| 2007/0033433 A1 * | 2/2007 | Pecone et al. | 714/6 |

OTHER PUBLICATIONS

Paul Massiglia; The RAID Book, a Storage System Technology Handbook; 6th Edition; The RAID Advisory Board, Inc.; Feb. 1997; pp. 137-142.*

* cited by examiner

*Primary Examiner* — Brian R Peugh
*Assistant Examiner* — Prasith Thammavong
(74) *Attorney, Agent, or Firm* — Griffiths & Seaton PLLC

(57) ABSTRACT

A method of dynamic allocation of non-volatile memory in a cache storage subsystem includes constraining a redundant array of independent disks (RAID) 6 array in an unavailable state, the RAID 6 array having been newly created in the subsystem, destaging data from a write cache to a storage medium to free memory space, reserving the freed memory space for allocation to data-persistent storage, allocating the memory space to an adapter in the subsystem as a target for data in the event of a power loss, and changing the RAID 6 array to an available state. A system for dynamic allocation of non-volatile memory in a cache storage subsystem includes a computer processing device which constrains a newly-created redundant array of independent disks (RAID) 6 array in an unavailable state to execute a reconfiguration method.

15 Claims, 3 Drawing Sheets

SYSTEM AND METHOD OF DYNAMIC ALLOCATION OF NON-VOLATILE MEMORY

BACKGROUND OF THE INVENTION

1. Field of the Invention

The present invention relates in general to computers, and, more particularly, to a system and method of dynamic allocation of non-volatile memory in cache storage subsystems.

2. Description of the Prior Art

A storage subsystem, such as the International Business Machines (IBM®) Enterprise Storage Server (ESS®), will receive Input/Output (I/O) requests directed toward an attached storage system. The attached storage system may comprise an enclosure including numerous interconnected disk drives, such as a Direct Access Storage Device (DASD), Redundant Array of Independent Disks (RAID Array), Just A Bunch of Disks (JBOD), etc. If I/O requests are received at a faster rate than they can be processed, then the storage subsystem will queue the I/O requests in a storage cache, which may comprise one or more gigabytes of volatile storage, e.g., Random Access Memory (RAM), Dynamic Random Access Memory (DRAM), etc. A copy of certain modified (write) data may also be placed in a non-volatile storage unit (NVS), such as a battery-backup volatile memory, to provide additional protection of write data in the event of a failure at the storage subsystem.

An entry is included in a Least Recently Used (LRU) list for each track in cache. A track can be staged from the storage system for cache to return to a read request. Additionally, write data for a track may be stored in cache before being transferred to the attached storage system. When additional space in cache is needed to buffer additional requested read data and modified data, tracks indicated at the LRU end of the LRU list are destaged to disk. An entry is added to the most recently used (MRU) end of the LRU list for each track added to cache. Each entry in the LRU list comprises a control block that indicates the current status of a track, the location in cache, and the location in the storage system. An additional NVS LRU list is maintained for tracks in the NVS. The cache and NVS LRU lists include entries for tracks in both NVS and cache.

In storage subsystems that provide a write cache to enhance performance, a method to persistently store and recover data is required to preserve data integrity during a loss-of-power scenario. If the data are not stored in a persistent manner, then the data in the write cache are lost when power is lost. There is no record of what data were lost during the power outage, so all of the data stored in the subsystem are suspect. The size of the write cache impacts the performance capability of the storage system in that it determines the limits to which write transactions can be processed by the system prior to requiring that the data be destaged to persistent media such as hard disk devices (HDDs).

In some storage subsystems, there are different requirements for the storage of persistent data to support system data recovery during a loss of power sequence and subsequent restoration of power. One such instance might be whether or not certain RAID levels are configured within a particular system. Different RAID levels may require that data from the RAID controller engine be persistently stored to provide recovery from certain failures during a restoration sequence following a loss of power. For those instances where there is a requirement to store additional data persistently in the event of a power loss, it may be required to reduce the size of the write cache in an equivalent amount to the new data that is required to be stored persistently. For cases where the additional data is not required to be stored persistently, it would not be necessary to reduce the size of the write cache.

SUMMARY OF THE INVENTION

In light of the foregoing, a need exists for a system and method to efficiently allocate the write cache persistent storage memory such that the configuration maximizes the performance of the storage subsystem. In addition, the system and method should take advantage of existing system resources and constraints to minimize cost and complexity while maximizing efficiency in a particular implementation.

In one embodiment, the present invention is a method of dynamic allocation of non-volatile memory in a cache storage subsystem, comprising constraining a redundant array of independent disks (RAID) 6 array in an unavailable state, the RAID 6 array having been newly created in the subsystem, destaging data from a write cache to a storage medium to free memory space, reserving the freed memory space for allocation to data-persistent storage, allocating the memory space to an adapter in the subsystem as a target for data in the event of a power loss, and changing the RAID 6 array to an available state.

In another embodiment, the present invention is a system for dynamic allocation of non-volatile memory in a cache storage subsystem, comprising a computer processing device which constrains a newly-created redundant array of independent disks (RAID) 6 array in an unavailable state to execute a reconfiguration method, a destage manager module connected to the computer processing device which destages data from a write cache of the subsystem to a storage medium to free memory space, and a cache manager module connected to the destage manager module which reserves the freed memory space for allocation to data-persistent storage and allocates the memory space to an adapter in the subsystem as a target for data in the event of a power loss, wherein, once the memory space is allocated, the computer processing device changes the RAID 6 array to an available state.

In another embodiment, the present invention is an article of manufacture including code for dynamically allocating non-volatile memory in a cache storage subsystem, wherein the code is capable of causing operations to be performed comprising constraining a redundant array of independent disks (RAID) 6 array in an unavailable state, the RAID 6 array having been newly created in the subsystem, destaging data from a write cache to a storage medium to free memory space, reserving the freed memory space for allocation to data-persistent storage, allocating the memory space to an adapter in the subsystem as a target for data in the event of a power loss, and changing the RAID 6 array to an available state.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
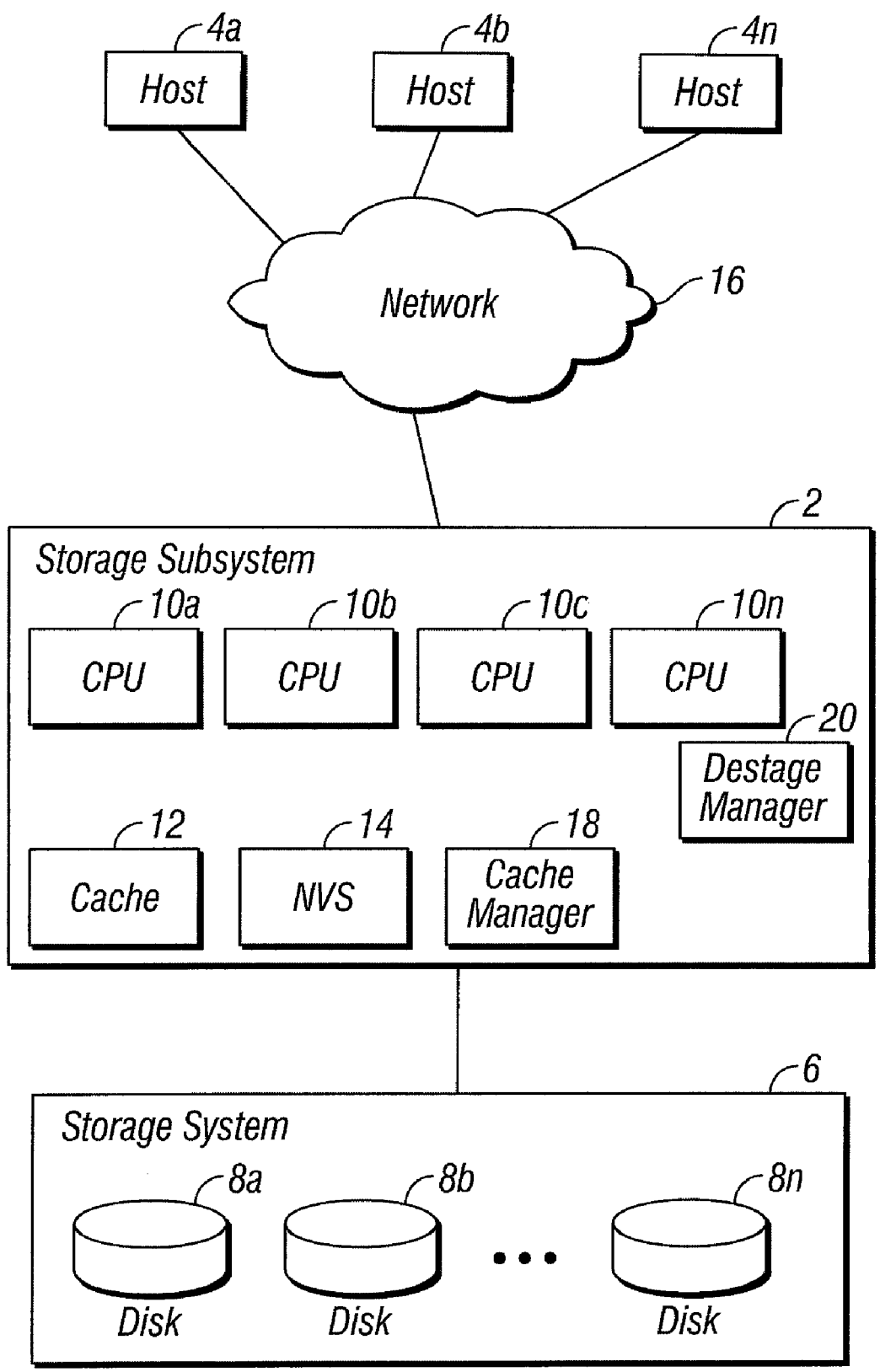
FIG. 1 illustrates a computing environment in which aspects of the invention are implemented.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

The schematic flow chart diagrams included are generally set forth as logical flow-chart diagrams. As such, the depicted order and labeled steps are indicative of one embodiment of the presented method. Other steps and methods may be conceived that correspond in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The present invention provides a system and method which first detects the presence of a need to store non-write cache data persistently, dynamically reduces the size of the write cache to accommodate the new persistent data storage requirement, and thereby allocates a persistent storage location to support persistent storage of the non-write cache data.

The present invention manages a static total persistent memory allocation and dynamically controls the allocation and apportionment of the persistent memory to system usages as a write cache and persistent memory repository for other secondary mission-critical data. The need for a repository for the secondary mission-critical data is dependent upon other storage system configuration parameters that can dynamically be changed during operation. To efficiently manage the dynamic nature of the types of persistent data (write cache and secondary mission-critical data) and corresponding requirements for the required storage capacity of each type of persistent data, a system to dynamically reconfigure the capacity of the write cache and allocate/apportion the persistent storage is described in the following paragraphs.

Turning to FIG. 1, a storage subsystem computing environment in which aspects of the present invention are implemented is depicted. A storage subsystem 2 receives I/O requests from hosts 4a, 4b . . . 4n directed to tracks in a storage system 6, which comprises one or more hard disk drives 8a, 8b . . . 8n. The storage system 6 and disk drives 8a, 8b . . . 8n may be configured as a DASD, one or more RAID ranks, etc. The storage subsystem 2 further includes one or more central processing units (CPUs) 10a, 10b, 10c . . . 10n, a cache 12 comprising a volatile memory to store tracks, and a non-volatile storage unit (NVS) 14 in which certain dirty (corrupted) or modified tracks in cache are buffered. The hosts 4a, 4b . . . 4n communicate I/O requests to the storage subsystem 2 via a network 16, which may comprise any network known in the art, such as a Storage Area Network (SAN), Local Area Network (LAN), Wide Area Network (WAN), the Internet, an Intranet, etc. The cache 12 may be implemented in one or more volatile memory devices and the NVS 14 implemented in one or more high-speed non-volatile storage devices, such as a battery-backed-up volatile memory. A cache manager 18 comprises either a hardware component or process executed by one of the CPUs 10a, 10b . . . 10n that manages the cache 12. A destage manager 20 comprises a software or hardware component that manages destage operations. Cache manager 18 and/or destage manager 20 can operate using hardware and software as described. Additionally, however, cache manager 18 and/or destage manager 20 can operate using a combination of various hardware and software which operates and executes on a storage subsystem 2.

Figure 2:
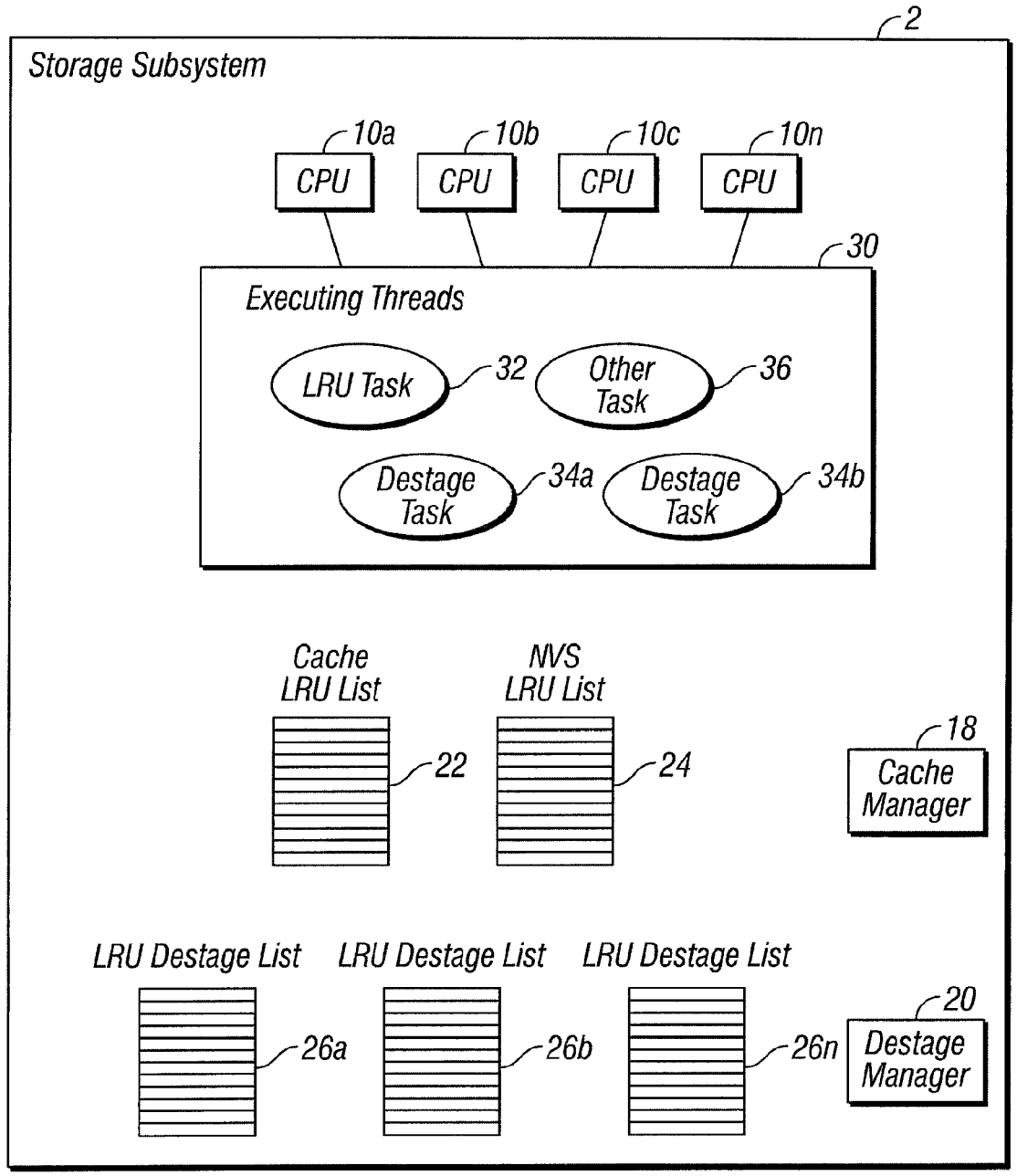
FIG. 2 illustrates program components used to implement cache management operations in implementations where disks in the storage system are organized into RAID ranks.

FIG. 2 illustrates example program components used to implement cache management operations in implementations where the disks 8a, 8b . . . 8n in the storage system 6 are organized into RAID ranks. FIG. 2 illustrates a cache LRU list 22 in which every track in cache 12 is listed, an NVS list 24 in which every track in the NVS 14 is listed, and one RAID Rank LRU list 26a, 26b . . . 26n for each RAID rank configured in the storage system 6. The CPUs 10a, 10b . . . 10n would execute threads to perform various operations. The executing threads 30 include an LRU task thread 32 that scans the cache LRU list 22 looking for entries for modified tracks that satisfy a certain criterion, such as a track in a specified RAID rank, multiple executing destage threads 34a and 34b that are called to destage a track from cache 12 to the storage system 6, and other threads 36 performing any other storage subsystem 2 operation.

In a particular embodiment of a storage subsystem supporting a RAID 6 topology, a processing component such as CPU 10 (i.e., RAID controller) provides a service that retains Atomic Parity Update (APU) data through a power loss event. The APU data are used to enable the system to recover from various fault conditions that were encountered prior to, concurrent to, and/or subsequent to a loss of power to the system. The requirement for retention of this data is dependent upon an existence of a RAID 6 RAID array within the storage system.

The method of providing the persistent storage for the APU data is to first allocate memory space within the write cache memory boundary. During a loss-of-power event, particularly during the storage facility power loss management sequence, the APU data are transferred into the write cache memory space and preserved by a battery backup system holding the write cache memory in self-refresh and/or a destage to persistent media. If there are no RAID 6 arrays in the storage system, there is no need to persistently store APU data.

If there are no RAID 6 RAID arrays in the storage system 6, there is no need to store the APU data on a power loss event. As such, there is no need to allocate any persistent storage capacity for APU data. In light of this scenario, the present invention provides a system and method having a detection mechanism which discovers a notification that a RAID 6 RAID array is being created, and, as a result, initializes a reconfiguration method. The reconfiguration method constrains the newly created RAID 6 array in an unavailable state while the method is being executed. The reconfiguration method automatically acts to force a reconfiguration of the write cache to free the required space to support the persistent storage of the APU data.

The reconfiguration method forces the destage of data from the write cache to media, while reserving the freed memory space for allocation to the APU data persistent storage. When the space in the persistent write cache has been freed, the persistent storage area is allocated to the adapter as the target for the APU data in the event of a power loss. Once the adapter has been notified and acknowledges that the persistent storage location has been allocated and is ready to receive data, the method changes the RAID 6 RAID array to an available state, in effect enabling the array to be operational.

Figure 3:
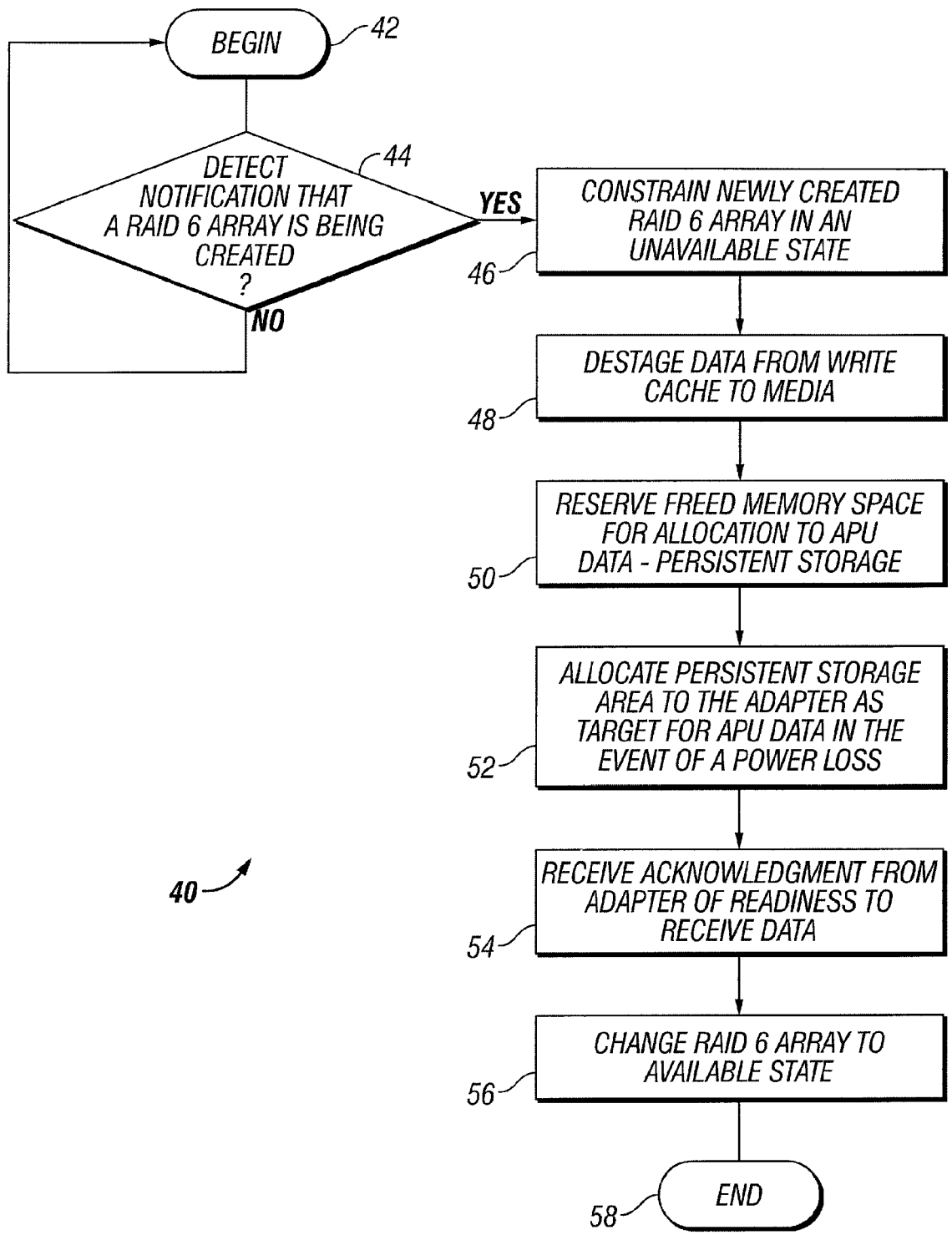
FIG. 3 illustrates an example method for implementing dynamic allocation of non-volatile memory in a cache storage subsystem according to the present invention.

FIG. 3 depicts an example reconfiguration method implementation in accordance with the present invention. The method 40 begins (step 42) with the detection of a notification that a RAID 6 RAID array has been newly created (step 44). The detection can be performed through one or more processing components, such as CPUs 10 or cache manager module 18, which can operate using hardware, software, or a combination of hardware and software in the computer storage subsystem 2.

If the subsystem 2 determines that a RAID 6 RAID array has been newly created, the RAID 6 array is then constrained by the subsystem in an unavailable state (step 46) while the remainder of the reconfiguration method 40 is executed. Cache manager module 18 then forces a reconfiguration of the write cache, using an executing thread 30 such as task 36. The reconfiguration of the write cache serves to free the required space to support persistent storage of the APU data, as previously described. As a next step, the destage manager module executes to force the destage of data from the write cache to media such as disk 8 (step 48). Method 40 then reserves the freed memory space for allocation to the APU data persistent storage (step 50).

When the space in the persistent write cache has been freed, the persistent storage area is allocated to an adapter operating in computing environment 2 as the target for the APU data in the event of a power loss (step 52). The adapter is then notified that the persistent storage location has been allocated and is ready to receive data, and the adapter acknowledges the information to a processing component such as CPU 10 or a similar controller (step 54). Finally, once the processing component has received the acknowledgement, the previously unavailable RAID 6 array is changed to reflect an available state (step 56) by the processing component. The reconfiguration method 40 then ends (step 58).

The implementation of the described system and method involves no significant additional expenditure of resources or additional hardware than what is already in use in standard computing environments utilizing RAID storage topologies, which makes the implementation cost-effective.

Implementing and utilizing the example systems and methods as described can provide a simple, effective method of providing dynamic allocation of non-volatile memory in a computing environment having storage systems and subsystems as described, and serves to maximize the performance of the storage system. While one or more embodiments of the present invention have been illustrated in detail, the skilled artisan will appreciate that modifications and adaptations to those embodiments may be made without departing from the scope of the present invention as set forth in the following claims.

What is claimed is:

1. A method of dynamic allocation of non-volatile memory in a cache storage subsystem, comprising:
   constraining a redundant array of independent disks (RAID) 6 array in an unavailable state, the RAID 6 array having been newly created in the subsystem;
   destaging data from a write cache to a storage medium apart of the RAID 6 array to free memory space in the write cache, dynamically reducing the size of the write cache to accommodate persistent data;
   reserving the freed memory space for allocation to store the persistent data, the persistent data including Atomic Parity Update APU data;
   allocating the freed memory space to an adapter in the subsystem as a target for the persistent data in the event of a power loss; and
   once the freed memory space is determined to have been allocated, changing the RAID 6 array to an available state.

2. The method of claim 1, further including, previous to the step of constraining the RAID 6 array in an unavailable state, detecting that the RAID 6 array has been created.

3. The method of claim 1, further including, pursuant to determining the freed memory space has been allocated, receiving an acknowledgement from the adapter that the freed memory space has been allocated and is ready to receive the persistent data.

4. The method of claim 1, wherein destaging data from the write cache to the storage medium is performed using a destage manager module operating as hardware, software, or a combination of hardware and software on the storage subsystem.

5. The method of claim 1, wherein reserving the freed memory space is performed using a cache manager module operating as hardware, software, or a combination of hardware and software on the storage subsystem.

6. A system for dynamic allocation of non-volatile memory in a cache storage subsystem, comprising:
   a computer processing device which constrains a newly-created redundant array of independent disks (RAID) 6 array in an unavailable state to execute a reconfiguration method;
   a destage manager module connected to the computer processing device which destages data from a write cache of the subsystem to a storage medium apart of the RAID 6 array to free memory space in the write cache, dynamically reducing the size of the write cache to accommodate persistent data; and
   a cache manager module connected to the destage manager module which reserves the freed memory space for allocation to store the persistent data, the persistent data including Atomic Parity Update (APU) data, and allocates the freed memory space to an adapter in the subsystem as a target for the persistent data in the event of a power loss, wherein, once the freed memory space is allocated, the computer processing device changes the RAID 6 array to an available state.

7. The system of claim 6, wherein the computer processing device detects a RAID 6 creation event.

8. The system of claim 6, wherein the adapter receives notification and acknowledges to the subsystem that a data-persistent storage location has been allocated and is ready to receive the persistent data.

9. The system of claim 6, wherein the destage manager module further comprises hardware, software, or a combination of hardware and software operating on the storage subsystem.

10. The system of claim 6, wherein the cache manager module further comprises hardware, software, or a combination of hardware and software operating on the storage subsystem.

11. An article of manufacture including a non-transitory signal bearing medium storing code for dynamically allocating non-volatile memory in a cache storage subsystem, wherein the code is capable of causing operations to be performed comprising:
    constraining a redundant array of independent disks (RAID) 6 array in an unavailable state, the RAID 6 array having been newly created in the subsystem;
    destaging data from a write cache to a storage medium apart of the RAID 6 array to free memory space in the write cache, dynamically reducing the size of the write cache to accommodate persistent data;
    reserving the freed memory space for allocation to store the persistent data, the persistent data including Atomic Parity Update (APU) data;
    allocating the freed memory space to an adapter in the subsystem as a target for the persistent data in the event of a power loss; and
    once the freed memory space is determined to have been allocated, changing the RAID 6 array to an available state.

12. The article of manufacture of claim 11, further including, previous to the step of constraining the RAID 6 array in an unavailable state, detecting that the RAID 6 array has been created.

13. The article of manufacture of claim 11, further including, pursuant to determining the freed memory space has been allocated, receiving an acknowledgement from the adapter that the freed memory space has been allocated and is ready to receive the persistent data.

14. The article of manufacture of claim 11, wherein destaging data from the write cache to the storage medium is performed using a destage manager module operating as hardware, software, or a combination of hardware and software on the storage subsystem.

15. The article of manufacture of claim 11, wherein reserving the freed memory space is performed using a cache manager module operating as hardware, software, or a combination of hardware and software on the storage subsystem.

* * * * *